Jan. 16, 1934. H. R. McMAHON Re. 19,050

BUMPER END CONSTRUCTION

Original Filed July 17, 1930

INVENTOR

Harry R. McMahon

By Green & McCallister

His Attorneys

Reissued Jan. 16, 1934

Re. 19,050

UNITED STATES PATENT OFFICE 19,050

BUMPER END CONSTRUCTION

Harry R. McMahon, Coraopolis, Pa., assignor to Standard Steel Spring Company, a corporation of Pennsylvania Original No. 1,793,948, dated February 24, 1931, Serial No. 468,615, July 17, 1930. Application for reissue May 29, 1931. Serial No. 541,087

3 Claims. (Cl. 293—55)

This invention relates to a bumper end construction of the same general type as that disclosed in my copending application Serial No. 468,614, filed July 17, 1930, for a bumper end construction (Case A).

Both in the aforesaid application and in the present invention the construction is such as to avoid edge bends which are recognized as hitherto accepted disadvantages inherent in many types of bumper construction, the same being a relatively difficult and also a relatively expensive procedure.

The present invention is an improvement over my copending application in that a certain simplification of parts has been effected, at the same time providing an unusually efficient construction.

An object of the present invention is the reconstruction of a bumper end assembly so as to provide a minimum of parts and a maximum of simplicity.

Another object of the invention is the provision of a bumper end construction wherein the bumper bar ends are formed into concentric inner and outer cylinders, the rear bar having the smaller narrower cylinder, generally, which fits within the wider and thicker cylinder formed at the ends of the single front or impact bar.

A further object is the elimination of a spacing member and a contouring of the outer cylinder so as to receive efficiently the inner cylinder and at the same time form a shoulder which rests upon the upper edge of the rear bar.

Other and further objects will be understood from my copending application and by those skilled in this particular art or will be pointed out hereinafter.

In the accompanying drawing:—

Figure 1:
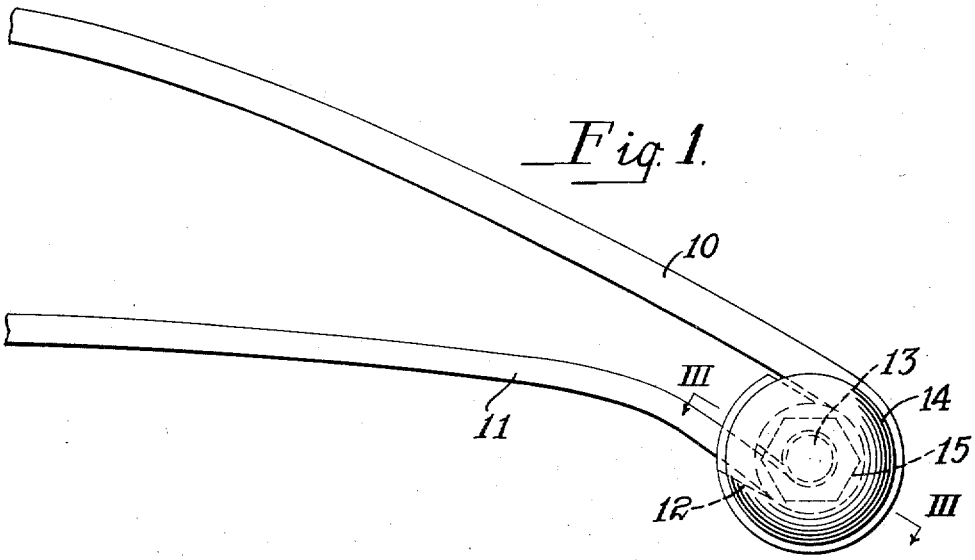
Figure 1 is a plan view of a bumper end construction embodying the present improvement.
Figure 2:
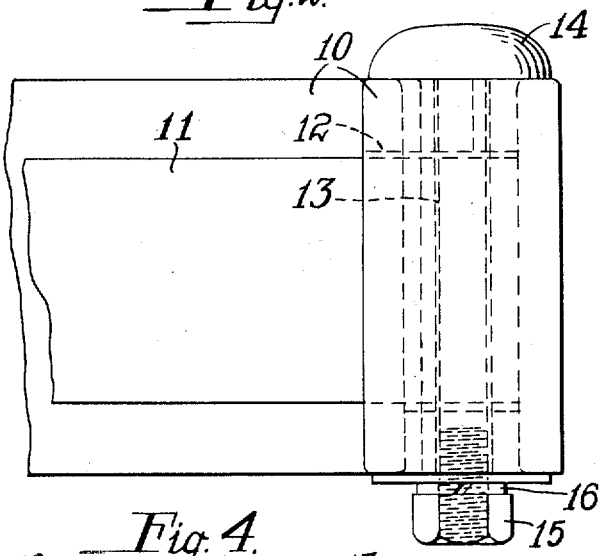
Fig. 2 is an elevational view of Fig. 1.
Figure 3:
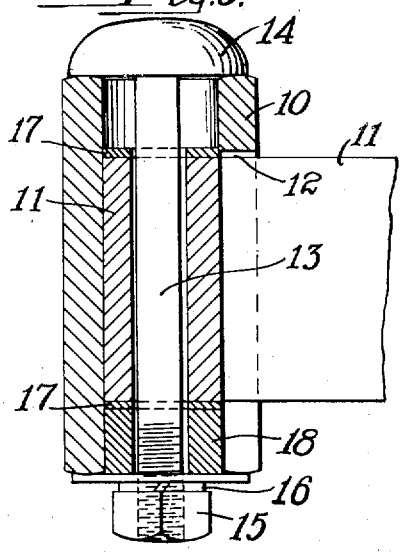
Fig. 3 is a cross section on the line III—III of Fig. 1.
Figure 4:
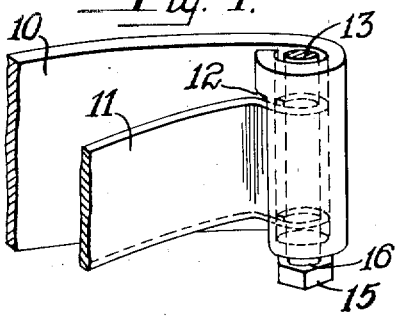
Fig. 4 is a perspective view of the foregoing embodiment.

In the drawing, and referring to the elements illustrated therein in detail, the single front or impact bar 10 is formed with a cylinder at its end and similarly the rear bar 11 is formed with a cylinder at its end, the various comments as to size and proportions referred to in my aforesaid copending application being of equal force here.

The larger cylinder formed at the end of the single front or impact bar 10 is, however, provided with a cut-out portion 12 extending vertically from the bottom of the cylinder to a point near the top and then horizontally to the end of the cylinder, thus leaving a shoulder, the function of which will be more fully explained hereinafter.

The cut-out portion 12 permits the insertion of the smaller second cylinder from the bottom of the larger cylinder until the upper edge of the rear bar abuts the shoulder which prevents further movement. The formation at the upper end of the larger cylinder in addition to the functions already described acts as a substitute for the upper spacer member of my copending application, there being necessary, therefore, only one spacer 18 at the bottom in the location shown.

The usual lock washers 17 and bolt 13 with enlarged head 14 and nut 15 are provided as shown and as understood without repetition here as is also the lock washer 16, with or without intermediate washers.

The construction shown provides for a very simple assembly and an equally ready disassembly when required. When assembled a very simple, but efficient construction is provided allowing for necessary relative movement of the parts when the front bar is impacted. The cylinders as shown are coiled in opposite directions due to the fact that the ends of the respective bars are oppositely bent. This has the advantage of keeping the portion of the rear bar adjacent its cylinder from too close proximity to the similar portion of the front bar, thereby preventing undue wear. It also has the advantage of so spacing and positioning one bar with respect to the other that each will have a more or less independent shock resisting resiliency.

What I claim as new and desire to secure by Letters Patent is:—

1. In an automotive bumper construction adapted to resist and yield under substantially horizontal impacts, a front bar and a rear bar, the rear bar being narrower than the front bar and substantially centrally disposed with reference to said front bar, each of said bars having each of its ends bent around substantially into contact with the bar to form closed cylindrical terminals, the terminals of the front bar being of a size to receive the terminals of the rear bar therewithin and the terminals of the front bar having their inner edges, which are contiguous to the rear surface of the bar, of substantially inverted L-shape to provide for each terminal a vertical slot extending for a major portion of the height of the terminal and a unitary upper shoulder, the rear bar extending outwardly through said vertical slot and limited as to vertical movement by abutment of the upper edge of such bar wtih the under edge of said unitary shoulder, the rear bar being limited in pivotal movement by the rear surface of the front bar and the vertical wall of said vertical slot, and means for pivotally maintaining said front and rear bar terminals in operative position as aforesaid in nested relationship.

2. In an automotive bumper construction adapted to resist and yield under substantially horizontal impacts, a front bar and a rear bar, the rear bar being narrower than the front bar and substantially centrally disposed with reference to said front bar, each of said bars having each of its ends bent around substantially into contact with the bar to form closed cylindrical terminals, the terminals of the front bar being of a size to receive the terminals of the rear bar therewithin and the terminals of the front bar having their inner edges which are contiguous to the rear surface of the bar, of substantially inverted L-shape to provide for each terminal a vertical slot extending for a major portion of the height of the terminal and a unitary upper shoulder, the rear bar extending outwardly through said vertical slot and limited as to vertical movement by abutment of the upper edge of such bar with the under edge of said unitary shoulder, the rear bar being limited in pivotal movement by the rear surface of the front bar and the vertical wall of said vertical slot, and means for pivotally maintaining said front and rear bar terminals in operative position as aforesaid in nested relationship, means being provided for maintaining the central position of the rear bar with respect to the front bar.

3. In an automotive bumper construction adapted to resist and yield under substantially horizontal impacts, a front bar and a rear bar, the rear bar being narrower than the front bar and substantially centrally disposed with reference to said front bar, each of said bars having each of its ends bent around substantially into contact with the bar to form closed cylindrical terminals, the terminals of the front bar being of a size to receive the terminals of the rear bar therewithin and the terminals of the front bar having their inner edges, which are contiguous to the rear surface of the bar, of substantially inverted L-shape to provide for each terminal a vertical slot extending for a major portion of the height of the terminal and a unitary upper shoulder, the rear bar extending outwardly through said vertical slot and limited as to vertical movement by abutment of the upper edge of such bar with the under edge of said unitary shoulder, the rear bar being limited in pivotal movement by the rear surface of the front bar and the vertical wall of said vertical slot, and means for pivotally maintaining said front and rear bar terminals in operative position as aforesaid in nested relationship and said terminal cylinders being oppositely coiled one from the other for spacing the contiguous bar portions.

HARRY R. McMAHON.